(12) United States Patent
Jeong et al.

(10) Patent No.: US 9,852,678 B2
(45) Date of Patent: Dec. 26, 2017

(54) DISPLAY DEVICE

(71) Applicant: Samsung Display Co., Ltd., Yongin-si, Gyeonggi-do (KR)

(72) Inventors: Seon I Jeong, Cheonan-si (KR); Hwa Young Song, Seoul (KR); Min Kyu Woo, Cheonan-si (KR); Dong Sun Lee, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/360,942

(22) Filed: Nov. 23, 2016

(65) Prior Publication Data

US 2017/0076655 A1  Mar. 16, 2017

Related U.S. Application Data

(62) Division of application No. 14/489,421, filed on Sep. 17, 2014, now Pat. No. 9,530,374.

(30) Foreign Application Priority Data

Apr. 3, 2014 (KR) ........................ 10-2014-0040031

(51) Int. Cl.
  G09G 3/20 (2006.01)
  G09G 3/36 (2006.01)
  G02F 1/1345 (2006.01)

(52) U.S. Cl.
  CPC ......... G09G 3/2085 (2013.01); G09G 3/3607 (2013.01); G09G 3/3685 (2013.01);
  (Continued)

(58) Field of Classification Search
  CPC .. G02F 1/1345; G09G 3/3607; G09G 3/3685; G09G 2300/0426; G09G 2300/043;
  (Continued)

(56) References Cited

U.S. PATENT DOCUMENTS 5,764,206 A    6/1998  Koyama et al.
6,329,673 B1  12/2001  Iida et al.
(Continued)

FOREIGN PATENT DOCUMENTS

KR    10-1999-0031752    *  5/1999
KR    1999-0031752           5/1999
(Continued)

OTHER PUBLICATIONS

Korean Patent Abstracts Publication. No. 100239413 B1, dated Oct. 21, 1999, for KR 1999-0031752, 1 page.

*Primary Examiner* — Julie Anne Watko
(74) *Attorney, Agent, or Firm* — Lewis Roca Rothgerber Christie LLP

(57) ABSTRACT

A display device includes: a display panel including a plurality of gate lines on a substrate, a plurality of data lines crossing the gate lines, and a plurality of pixels, each of the pixels being coupled to one of the gate lines and to one of the data lines; a data driver configured to output data signals through a plurality of channel terminals; and a line selector configured to transmit the data signals to a plurality of data line blocks, each of the data line blocks including a plurality of data lines, wherein the line selector includes a plurality of thin-film transistors, and at least two of the thin-film transistors have different sizes.

6 Claims, 20 Drawing Sheets

(52) U.S. Cl.
CPC ......... *G09G 3/3688* (2013.01); *G02F 1/1345* (2013.01); *G09G 2300/043* (2013.01); *G09G 2300/0426* (2013.01); *G09G 2300/0814* (2013.01); *G09G 2310/0297* (2013.01)

(58) Field of Classification Search
CPC ... G09G 2300/0814; G09G 2310/0297; G09G 3/3611; G09G 3/3692; G09G 2300/0809; G09G 2300/0838; G09G 2310/0264; G09G 2310/027; G09G 2310/0202; G09G 2310/021; G09G 2310/02; G09G 2310/00; G09G 2310/0205; G09G 2310/0218; G09G 3/3688
USPC .......................................................... 345/92
See application file for complete search history.

(56) References Cited

U.S. PATENT DOCUMENTS

| | | | |
|---|---|---|---|
| 6,952,244 B2 * | 10/2005 | Cairns | G02F 1/136213 257/59 |
| 8,179,489 B2 * | 5/2012 | Jung | G02F 1/13624 349/139 |
| 8,446,092 B2 | 5/2013 | Tomida et al. | |
| 8,531,370 B2 * | 9/2013 | Chen | G09G 3/3659 345/92 |
| 8,643,400 B2 | 2/2014 | Yoshida | |
| 9,147,370 B2 * | 9/2015 | Tobita | G09G 3/3688 |
| 9,218,757 B2 * | 12/2015 | Min | G09G 3/18 |
| 9,370,075 B2 * | 6/2016 | Chaji | H05B 37/02 |
| 2003/0132907 A1 * | 7/2003 | Lee | G09G 3/3685 345/98 |
| 2005/0024547 A1 * | 2/2005 | Park | G02F 1/136213 349/39 |
| 2005/0057476 A1 * | 3/2005 | Lin | G09G 3/3648 345/92 |
| 2005/0253836 A1 * | 11/2005 | Kim | G02F 1/136286 345/212 |
| 2006/0071884 A1 * | 4/2006 | Kim | G09G 3/3233 345/76 |
| 2006/0139255 A1 * | 6/2006 | Kim | G09G 3/3233 345/76 |
| 2006/0214942 A1 * | 9/2006 | Tanase | G09G 3/2003 345/589 |
| 2006/0244704 A1 * | 11/2006 | JaeHun | G09G 3/3655 345/92 |
| 2008/0055304 A1 * | 3/2008 | Ryu | G09G 3/2022 345/214 |
| 2009/0102691 A1 * | 4/2009 | Chang | G09G 3/20 341/148 |
| 2009/0262258 A1 | 10/2009 | Taneda et al. | |
| 2010/0214326 A1 * | 8/2010 | Yoshiga | G09G 3/3659 345/690 |
| 2011/0115998 A1 * | 5/2011 | Liao | G02F 1/136213 349/38 |
| 2011/0205461 A1 * | 8/2011 | Chen | G09G 3/3648 349/38 |
| 2013/0162616 A1 | 6/2013 | Park et al. | |
| 2014/0333683 A1 * | 11/2014 | Qi | G09G 3/3233 345/690 |
| 2015/0364081 A1 * | 12/2015 | Tseng | G09G 3/3413 345/694 |

FOREIGN PATENT DOCUMENTS

| | | |
|---|---|---|
| KR | 10-2005-0003753 | 1/2005 |
| KR | 10-2006-0027023 | 1/2005 |
| KR | 10-2006-0117119 | 11/2006 |
| KR | 10-2009-0025402 | 3/2009 |
| KR | 10-2009-0102623 | 9/2009 |

* cited by examiner

DISPLAY DEVICE

CROSS-REFERENCE TO RELATED APPLICATION

This application is a divisional of U.S. patent application Ser. No. 14/489,421, filed Sep. 17, 2014, which claims priority to and the benefit of Korean Patent Application No. 10-2014-0040031, filed Apr. 3, 2014, the entire content of both of which is incorporated herein by reference.

BACKGROUND

1. Field

Embodiments of the present invention relate to a liquid crystal display (LCD).

2. Description of the Related Art

A display device displays an image corresponding to a video signal by adjusting light transmittance of liquid crystals. Such a liquid crystal display (LCD) includes an LCD panel in which liquid crystal cells are arranged in an active matrix pattern and driver circuits which drive the LCD panel. The active matrix LCD panel includes a plurality of data lines formed thereon, a plurality of gate lines crossing the data lines, and a plurality of pixel-driving thin-film transistors formed at crossing regions of the data lines and the gate lines. The driver circuits of the LCD include a data driver circuit for supplying data to the data lines of the LCD panel and a gate driver circuit for supplying scan pulses to the LCD panel. The driver circuits may further include a demultiplexer which is interposed between the data driver circuit and the data lines and distributes one output of the data driver circuit to a number of data lines. The demultiplexer reduces the number of outputs of the data driver circuit. Accordingly, the data driver circuit can be simplified, and the number of data input terminals of the LCD panel can be reduced. In addition, since the driver circuit is separated or spaced from the data lines (e.g., by a specific distance), the data lines may have different resistance values due to their different lengths.

The different resistance values may cause the data lines to have different signal delays. Accordingly, a different data voltage may be applied to each position, resulting in a vertical line defect (e.g., stain) and crosstalk due to coupling with a scan signal.

SUMMARY

Aspects of embodiments of the present invention provide a display device in which the size of a demultiplexer is adjusted in order to reduce a difference in signal delay.

Aspects of embodiments of the present invention also provide a display device in which a capacitor is added to a demultiplexer in order to reduce a difference in signal delay.

Aspects of embodiments of the present invention also provide a display device in which thicknesses of data lines are adjusted in order to reduce a difference in signal delay.

However, aspects of embodiments of the present invention are not restricted to the ones set forth herein. The above and other aspects of embodiments of the present invention will become more apparent to one of ordinary skill in the art to which embodiments of the present invention pertain by referencing the detailed description of embodiments of the present invention given below.

According to an embodiment of the present invention, there is provided a display device including a display panel including a plurality of gate lines on a substrate, a plurality of data lines crossing the gate lines, and a plurality of pixels, each of the pixels being coupled to one of the gate lines and to one of the data lines, a data driver configured to output data signals through a plurality of channel terminals, and a line selector configured to transmit the data signals to a plurality of data line blocks, each of the data line blocks including a plurality of data lines, wherein the line selector includes a plurality of thin-film transistors, and at least two of the thin-film transistors have different sizes.

The line selector may include a plurality of switching blocks, wherein each of the switching blocks is configured to transmit a data signal output from one of the channel terminals to a data line block coupled to the one of the channel terminals.

Each of the switching blocks may include a plurality of thin-film transistors, and the switching blocks may include equal numbers of thin-film transistors.

The display device may further include a signal controller configured to output a selection control signal for controlling the line selector.

The thin-film transistors may be configured to transmit the data signals to the data line blocks in response to the selection control signal.

The pixels may include a red pixel, a green pixel, and a blue pixel.

The line selector may include a plurality of switching blocks, and each of the switching blocks may include three thin-film transistors of an equal size.

The pixels may include a red pixel, a green pixel, a blue pixel, and a white pixel.

The line selector may include a plurality of switching blocks, and each of the switching blocks may include four thin-film transistors of an equal size.

According to another embodiment of the present invention, there is provided a display device including: a display panel including a plurality of gate lines on a substrate, a plurality of data lines crossing the gate lines, and a plurality of pixels, each of the pixels being coupled to one of the gate lines and to one of the data lines; a data driver configured to output data signals through a plurality of channel terminals; and a line selector configured to transmit the data signals to a plurality of data line blocks, each of the data line blocks including a plurality of data lines, wherein the line selector includes: a plurality of switching blocks; a plurality of selection control lines coupling the switching blocks and configured to transmit a selection control signal; and a compensation capacitor coupled to each of the selection control lines.

The display device may further include a signal controller configured to output the selection control signal for controlling the line selector.

Each of the switching blocks may include a plurality of thin-film transistors, and the switching blocks may include an equal number of thin-film transistors.

Each of the thin-film transistors may be configured to transmit a data signal to a corresponding data line block in response to the selection control signal.

The pixels may include a red pixel, a green pixel and a blue pixel, and each of the switching blocks may include three thin-film transistors of an equal size.

The pixels may include a red pixel, a green pixel, a blue pixel and a white pixel, and each of the switching blocks may include four thin-film transistors of an equal size.

According to another embodiment of the present invention, there is provided a display device including: a display panel including a plurality of gate lines formed on a substrate, a plurality of data lines crossing the gate lines, and a plurality of pixels, each of the pixels being coupled to one of the gate lines and to one of the data lines; a data driver configured to output data signals through a plurality of channel terminals; and a line selector configured to transmit the data signals to a plurality of data line blocks, each of the data line blocks including a plurality of data lines, wherein at least two of the gate lines have different widths.

The line selector may include a plurality of switching blocks, wherein each of the switching blocks is configured to transmit a data signal output from one of the channel terminals to a data line block coupled to the one of the channel terminals, and each of the switching blocks includes a plurality of thin-film transistors.

The display device may further include a signal controller configured to output the selection control signal for controlling the line selector, wherein each of the thin-film transistors is configured to transmit a data signal to a corresponding data line block in response to the selection control signal.

The pixels may include a red pixel, a green pixel and a blue pixel, and each of the switching blocks may include three thin-film transistors of an equal size.

The pixels may include a red pixel, a green pixel, a blue pixel and a white pixel, and each of the switching blocks may include four thin-film transistors of an equal size.

BRIEF DESCRIPTION OF THE DRAWINGS

The above and other aspects and features of the present invention will become more apparent by describing in detail example embodiments thereof with reference to the attached drawings, in which.

DETAILED DESCRIPTION

Figure 1:
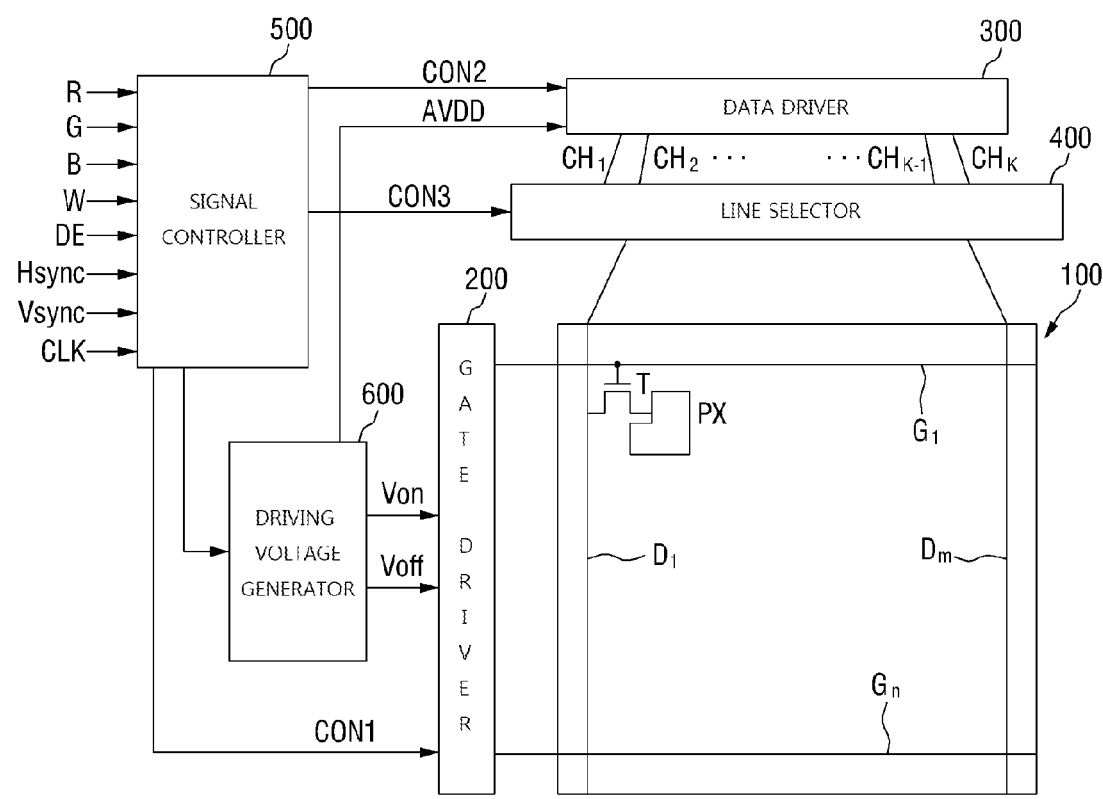
FIG. 1 is a block diagram of a display device according to an embodiment of the present invention.

Aspects and features of the present invention and methods of accomplishing the same may be understood more readily by reference to the following detailed description of example embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims, and equivalents thereof. Thus, in some embodiments, well-known structures and devices may not be shown in order not to obscure the description of the invention with unnecessary detail. Like numbers refer to like elements throughout. In the drawings, the thickness of layers and regions are exaggerated for clarity.

It will be understood that when an element or layer is referred to as being "on," or "connected to" or "coupled to" another element or layer, it can be directly on or connected to or coupled to the other element or layer or intervening elements or layers may be present. In contrast, when an element is referred to as being "directly on" or "directly connected to" or "directly coupled to" another element or layer, there are no intervening elements or layers present. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views of the invention. Accordingly, the example views may be modified depending on manufacturing technologies and/or tolerances. Therefore, the embodiments of the present invention are not limited to those shown in the views, but include modifications in configuration formed on the basis of manufacturing processes. Therefore, example regions in figures have schematic properties, and shapes of regions shown in figures are examples of specific shapes of regions of elements and do not limit aspects of the present invention.

A "display device" described herein may encompass a liquid crystal display (LCD) or an organic light-emitting display (e.g., organic light emitting diode (OLED) display).

Hereinafter, embodiments of the present invention will be described with reference to the attached drawings.

Figure 2:
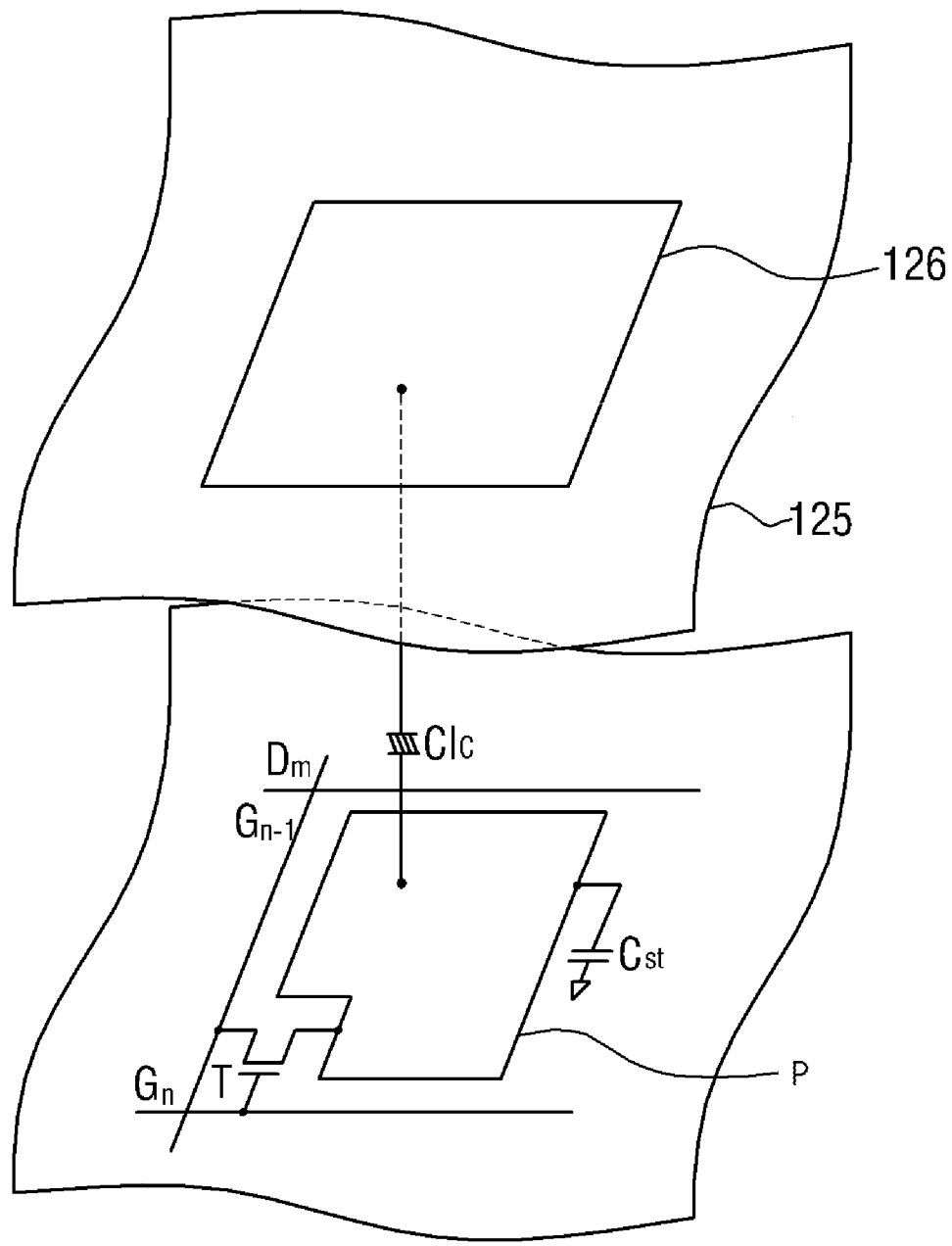
FIG. 2 is an equivalent circuit diagram of one pixel illustrated in FIG. 1.

FIG. 1 is a block diagram of a display device according to an embodiment of the present invention. FIG. 2 is an equivalent circuit diagram of one pixel illustrated in FIG. 1.

Referring to FIGS. 1 and 2, the display device according to the current embodiment includes a display panel 100, a gate driver 200, a data driver 300, a line selector 400, a signal controller 500, and a driving voltage generator 600.

The display panel 100 includes a plurality of gate lines G1 through Gn extending along a direction (e.g., a row direction) and a plurality of data lines D1 through Dm extending along another direction (e.g., a column direction) orthogonal to the above direction. The display panel 100 further includes pixel regions provided at crossing regions of the gate lines G1 through Gn and the data lines D1 through Dm. A pixel PX including a thin-film transistor T, a storage capacitor Cst, and a liquid crystal capacitor Clc is formed in each of the pixel regions. The display panel 100 includes a thin-film transistor substrate 11 on which the thin-film transistors T, the gate lines G1 through Gn, the data lines D1 through Dm and pixel electrodes P are formed, and a color filter substrate 120 on which a black matrix, color filters, and a common electrode are formed.

A thin-film transistor T includes a gate electrode, a source electrode and a drain electrode. The gate electrode is coupled to a gate line, the source electrode is coupled to a data line, and the drain electrode is coupled to a pixel electrode P.

The thin-film transistor T operates in response to a gate signal transmitted to the gate line and changes an electric field formed at both terminals of a liquid crystal capacitor Clc by transmitting a data signal received through the data line to the pixel electrode P. As a result, the arrangement of liquid crystals 130 is changed, thereby adjusting the transmittance of light supplied from a backlight.

The gate driver 200, the data driver 300, the line selector 400, the signal controller 500 and the driving voltage generator 600 provide a plurality of signals for driving the display panel 100. The gate driver 200 may be formed directly on the display panel 100. The data driver 300 may be mounted on the display panel 100. Alternatively, the data driver 3 may be mounted on a printed circuit board (PCB) and then electrically coupled to the display panel 1 by a flexible printed circuit board (FPCB). The line selector 400 may be mounted on the display panel 100, and the signal controller 500 and the driving voltage generator 600 may be mounted on a PCB and electrically coupled to the display panel 100 by an FPCB.

The signal controller 500 receives an image signal, that is, pixel data R, G, B and W and control signals for controlling the display of the pixel data R, G, B and W from an external graphics controller. Examples of the control signals include a horizontal synchronization signal Hsync, a vertical synchronization signal Vsync, a main clock CLK, and a data enable signal DE. The signal controller 500 generates a gate control signal CON1, a data control signal CON2, and a selection control signal CON3 by processing the pixel data R, G, B and W according to the operating condition of the display panel 100 and transmits the gate control signal CON1, the data control signal CON2 and the selection control signal CON3 to the gate driver 200, the data driver 300 and the line selector 400, respectively. Here, the gate control signal CON1 includes a vertical synchronization start signal for instructing the output start of a gate turn-on voltage Von, a gate clock signal for controlling the output timing of the gate turn-on voltage Von, and an output enable signal for controlling the duration of the gate turn-on voltage Von. In addition, the data control signal CON2 includes a horizontal synchronization start signal for informing the transmission start of pixel data, a load signal for instructing the application of a data voltage to a corresponding data line, an inversion signal for inverting the polarity of a gray voltage relative to a common voltage, and a data clock signal. The selection control signal CON3 includes a plurality of selection control signals, e.g., first through third selection control signals CON31 through CON33 (see FIG. 6), for controlling the operation of a plurality of switching devices included in each of line blocks that constitute the line selector 400.

The driving voltage generator 600 generates various driving voltages for driving an LCD using external power input from an external power source. The driving voltage generator 600 generates a reference voltage AVDD, the gate turn-on voltage Von, a gate turn-off voltage Voff, and the common voltage. In response to the control signals from the signal controller 500, the driving voltage generator 600 applies the gate turn-on voltage Von and the gate turn-off voltage Voff to the gate driver 200 and applies the reference voltage AVDD to the data driver 300. Here, the reference voltage AVDD is used as a reference voltage needed to generate a gray voltage for driving liquid crystals.

The gate driver 200 applies the gate turn-on/turn-off voltage Von/Voff received from the driving voltage generator 600 to the gate lines G1 through Gn in response to the gate control signal CON1 received from the signal controller 500. Accordingly, a corresponding thin-film transistor T can be controlled such that a gray voltage which will be applied to each pixel is applied to a corresponding pixel.

The data driver 300 generates a gray voltage using the data control signal CON2 received from the signal controller 500 and the reference voltage AVDD received from the driving voltage generator 600, and applies the gray voltage to each of a plurality of channel terminals CH1 through CHk.

Figure 3:
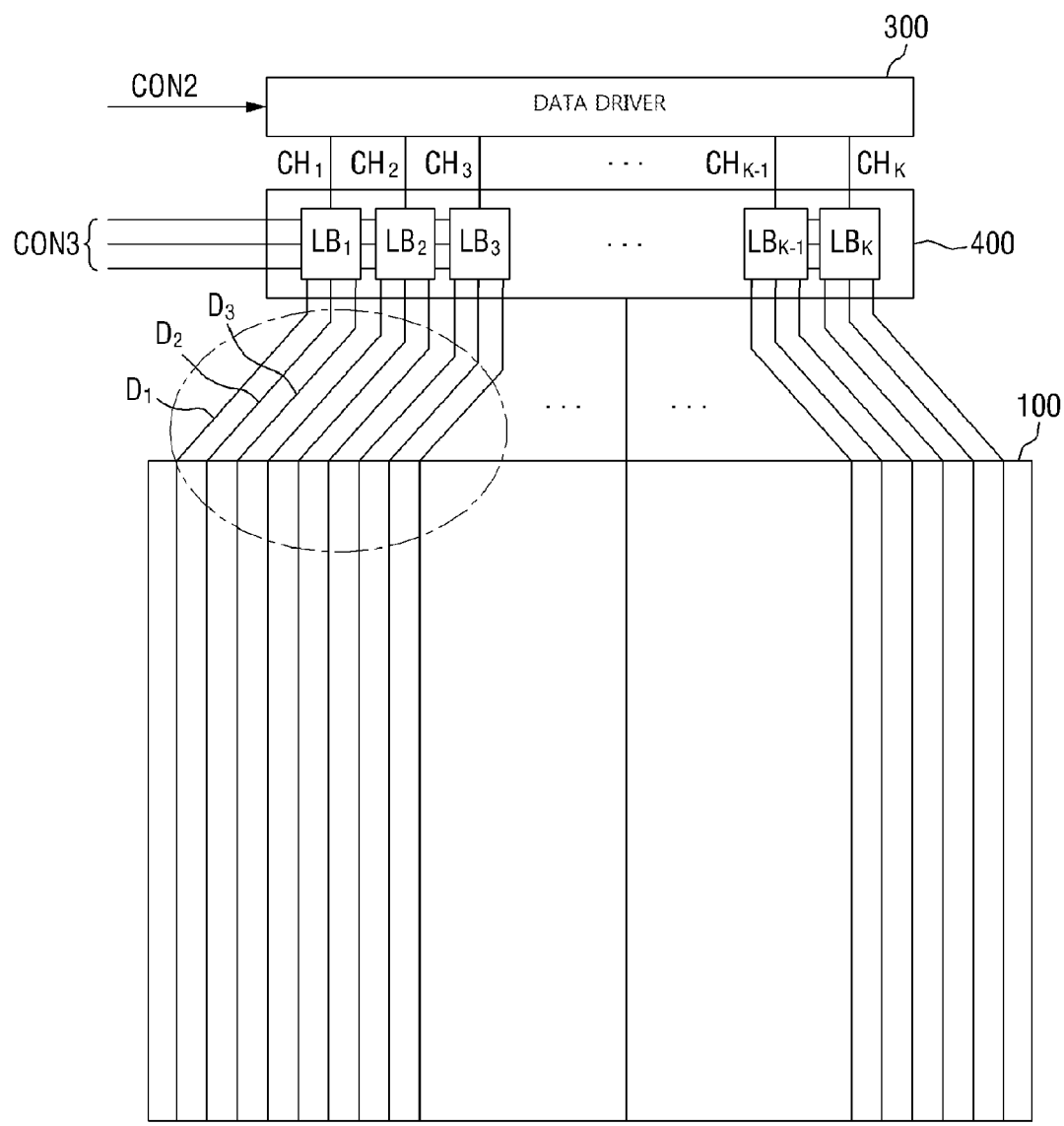
FIG. 3 is a plan view of a line selector according to an embodiment of the present invention.
Figure 4:
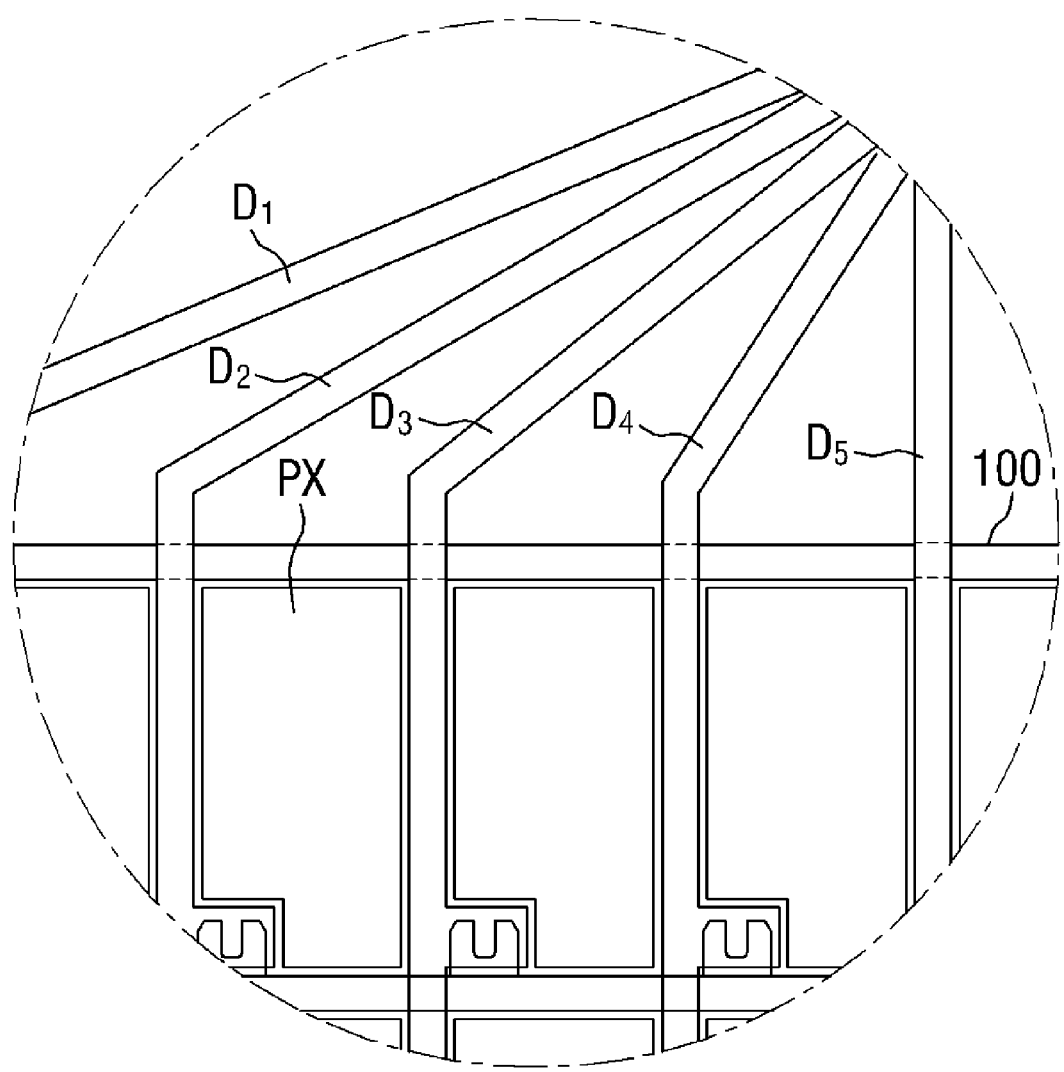
FIG. 4 is an enlarged plan view of a portion shown in FIG. 3.

FIG. 3 is a plan view of a line selector 4 according to an embodiment of the present invention. FIG. 4 is an enlarged plan view of a portion shown in FIG. 3.

Figure 5:
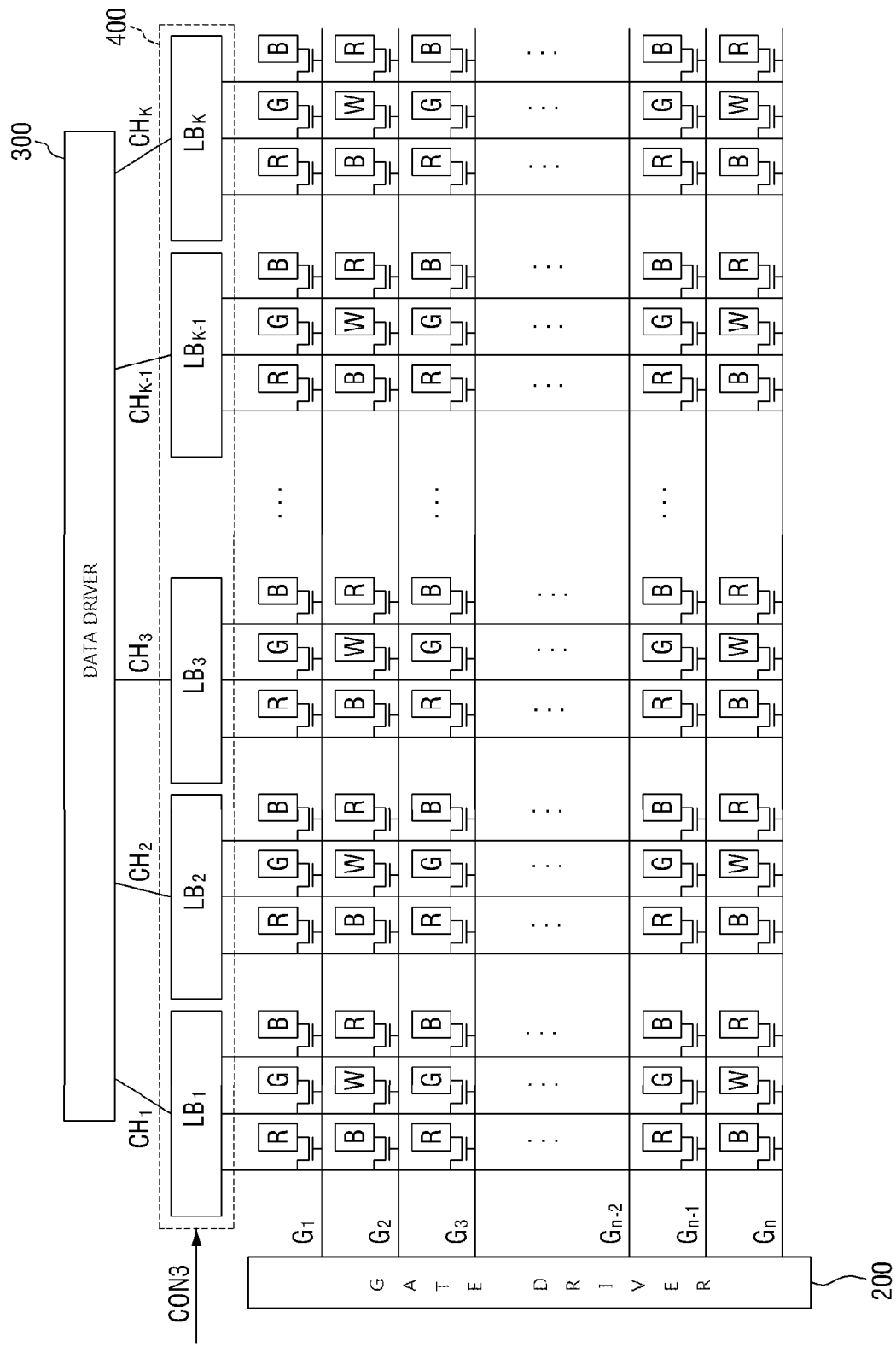
FIG. 5 is a diagram illustrating the structure of a display panel according to an embodiment of the present invention.
Figure 10:
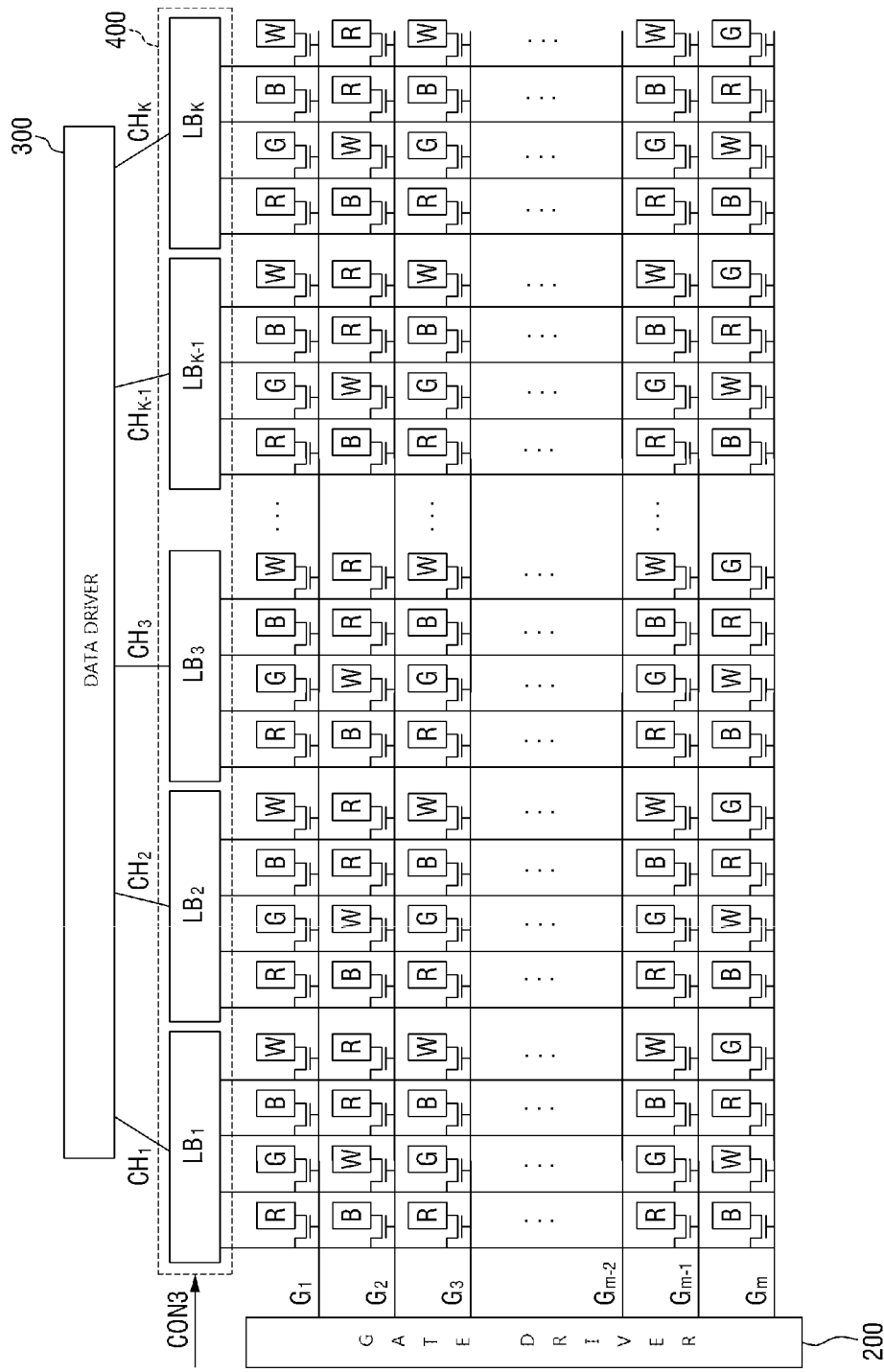
FIG. 10 is a diagram illustrating the structure of a display panel according to another embodiment of the present invention.

Referring to FIG. 3, the line selector 4 according to the current embodiment may include a plurality of line blocks LB1 through LBk. The line blocks LB1 through LBk may receive data signals through a plurality of channel terminals CH1 through CHk coupled to the data driver 300. In addition, the line selector 400 may transmit the data signals received through the channel terminals CH1 through CHk to the data lines D1 through Dm in response to the selection control signal CON3 received from the signal controller 500. The line blocks LB1 through LBk may include equal numbers of thin-film transistors. In FIG. 5 which will be described later, each of the line blocks LB1 through LBk includes three thin-film transistors. In FIG. 10, each of the line blocks LB1 through LBk includes four thin-film transistors. However, the present invention is not limited thereto, and each of the line blocks LB1 through LBk may include two or more thin-film transistors. The thin-film transistors may serve as switches that transmit data signals to the data lines D1 through Dm.

A driver integrated circuit (IC) integrates the largest possible number of switching devices in a limited area. Therefore, the data driver 300 and the line selector 400 may be smaller in size than the display panel 100. That is, as illustrated in FIG. 3, the line selector 400 is narrower than the display panel 100 and coupled to the data lines D1 through Dm which are coupled to the display panel 100. The data lines D1 through Dm coupled to the line selector 400 may be arranged in a radial pattern. That is, a data line coupled to a pixel located far away from the line selector 400 is longer than a data line coupled to a pixel located adjacent to the line selector 400 and has a greater resistance value. The data lines D1 through Dm do not overlap each other.

The arrangement of the line selector 400 and the display panel 100 is not limited to the arrangement of FIG. 3, and the line selector 400 may be placed at various positions.

Figure 6:
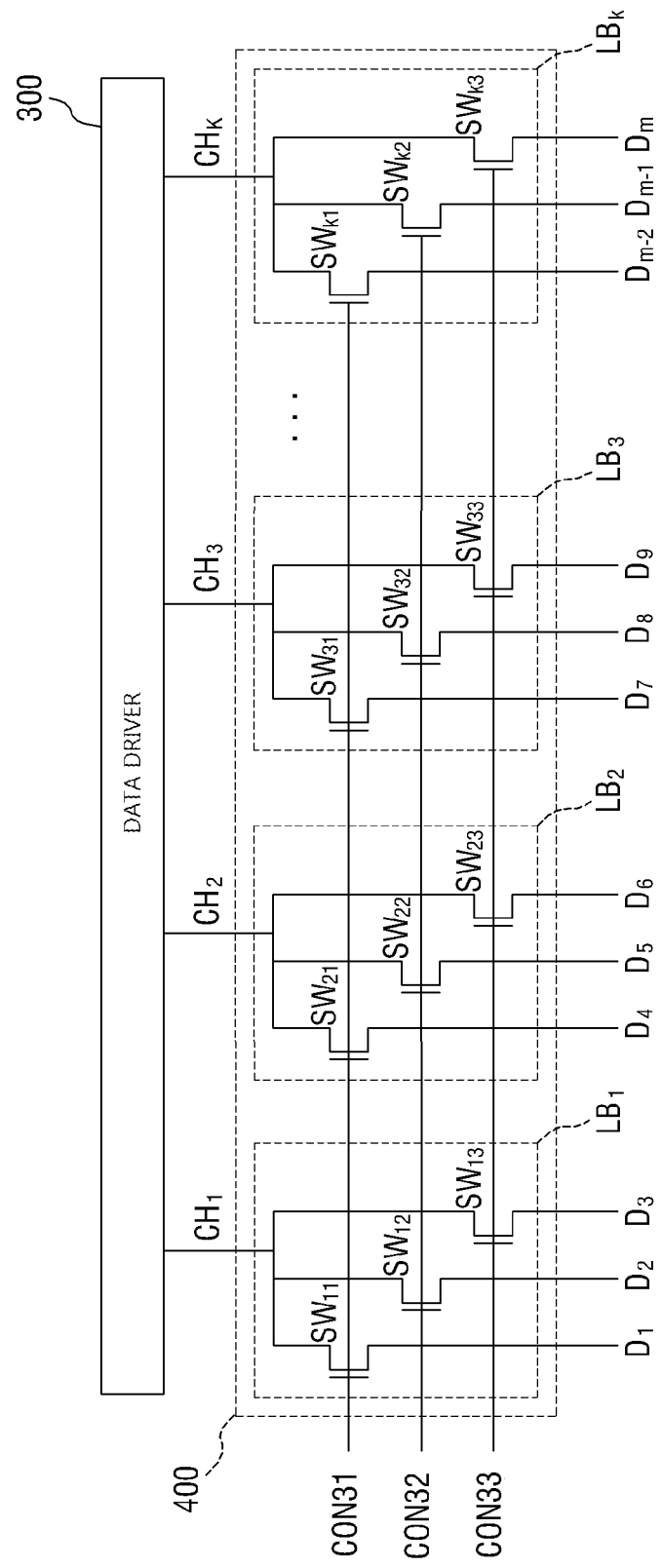
FIG. 6 is a diagram illustrating the line selector shown in FIG. 3.
Figure 7:
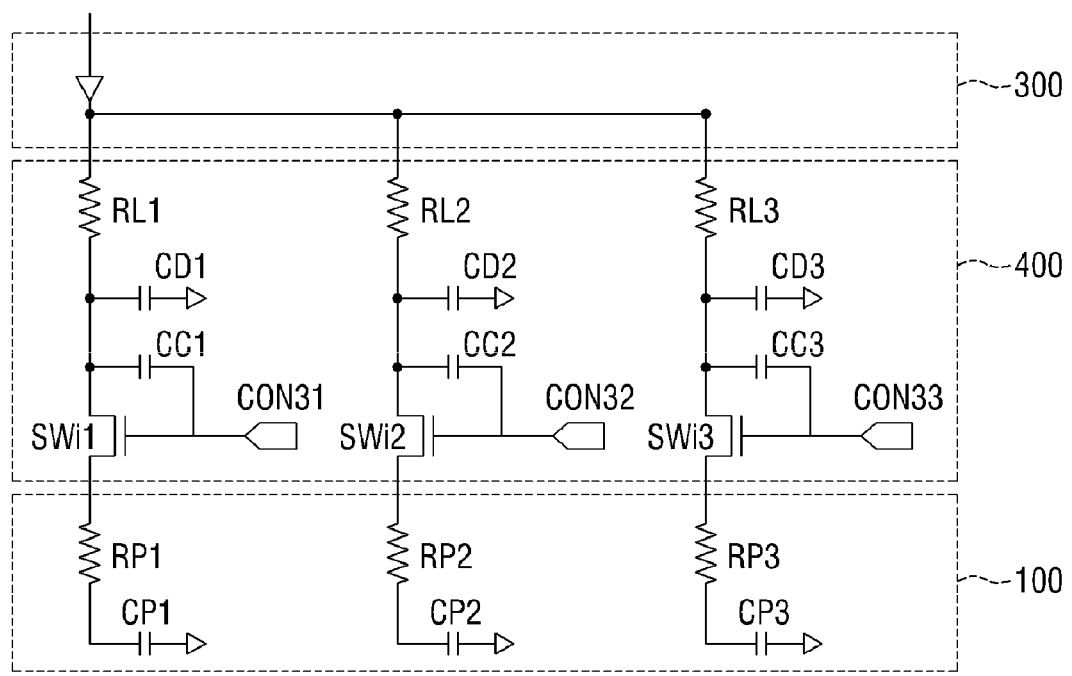
FIG. 7 is a circuit diagram of the display device illustrated in FIG. 1.

FIG. 5 is a diagram illustrating the structure of a display panel 100 according to an embodiment of the present invention. FIG. 6 is a diagram illustrating the line selector 400 shown in FIG. 3. FIG. 7 is a circuit diagram of the display device illustrated in FIG. 1.

Referring to FIG. 5, the display panel 100 includes a plurality of gate lines G1 through Gn extending along a row direction and a plurality of data lines D1 through Dm extending along a column direction that crosses the row direction. In addition, the display panel 100 includes a plurality of pixels formed at crossing regions of the gate lines G1 through Gn and the data lines D1 through Dm. Each of the pixels is coupled to one of the gate lines G1 through Gn and one of the data lines D1 through Dm.

The pixels may include red, green and blue pixels R, G and B. In the current embodiment, the red pixel R, the green pixel G, and the blue pixel B may be arranged sequentially in each odd-numbered row. The red pixel R, the green pixel G and the blue pixel B can also be arranged in various patterns other than the arrangement pattern described in the current embodiment. For example, the red pixel R, the green pixel G, and the blue pixel B may be arranged such that pixels of the same color are not arranged successively in the row direction and the column direction.

The data lines D1 through Dm are grouped into a plurality of data line blocks. Each of the data line blocks includes of a plurality of data lines, for example, three data lines. In one embodiment, each channel terminal CH is coupled to a corresponding data line block including three data lines by the line selector 400.

Referring to the configuration and operation of the line selector 400 of FIG. 6, the line selector 400 includes a plurality of line blocks LB1 through LBk. Here, the number of the line blocks LB1 through LBk may be equal to the number of channel terminals of the data driver 300. In addition, each of the line blocks LB1 through LBk includes a plurality of switching devices, for example, three switching devices. The number of switching devices included in each of the line blocks LB1 through LBk may be equal to the number of data lines included in each data line block.

Switching devices SW11 through SW13 coupled to a first data line block sequentially transmit a data signal output from a first channel terminal CH1 to a plurality of data lines, and switching devices SW21 through SW23 coupled to a second data line block sequentially transmit a data signal output from a second channel terminal CH2 to a plurality of data lines. The order in which a data signal is transmitted to a plurality of data lines included in the first data line block may be the same as the order in which a data signal is transmitted to a plurality of data lines included in the second data line block. However, the present invention is not limited thereto, and data signals can also be concurrently (e.g., simultaneously) transmitted to the data lines D1 through Dm, respectively. In the current embodiment, each line block LBi includes three switching devices SWi1 through SWi3 in order to couple one channel terminal CHi to three data lines. The switching devices SWi1 through SWi3 may be transistors. However, the present invention is not limited thereto, and the switching devices SWi1 through SWi3 may be any other devices capable of performing a switching operation.

The first switching device SWi1 included in an ith line block LBi may be driven in response to the first selection control signal CON31, the second switching device SWi2 included in the ith line block LBi may be driven in response to the second selection control signal CON32, and the third switching device SWi3 included in the ith line block LBi may be driven in response to the third selection control signal CON33.

Referring to a circuit formed in the data driver 300, the line selector 400, and the display panel 100 shown in FIG. 7, the data driver 300 may amplify a data signal DS and transmit the amplified data signal DS to one of the channel terminals CH1 through CHk. The operation of the data driver 300 may be in accordance with the driving principle of a general data driver, and thus a detailed description thereof will be omitted.

The line selector 400 may include the line blocks LB1 through LBk, and each of the line blocks LB1 through LBk may include the switching devices SWi1 through SWi3 respectively corresponding to the red pixel R, the green pixel G, and the blue pixel B. The switching devices SWi1 through SWi3 respectively corresponding to the red pixel R, the green pixel G and the blue pixel B may transmit a data signal to a plurality of data lines in response to the first through third selection control signals CON31 through CON33, respectively. The switching devices SWi1 through SWi3 may respectively include coupling capacitors CC1 through CC3 and line capacitors CD1 through CD3. A coupling capacitor and a line capacitor may stably maintain the magnitude of a voltage applied to a switching device and maintain a voltage level at which the switching device can be turned on. Line resistors RL1 through RL3 included in the line selector 4 may have resistance values that are proportional to lengths of data lines corresponding to individual pixels. The sizes of the line resistors RL1 through RL3 may be determined by the lengths and thicknesses of the data lines extending from the line selector 4. That is, different line blocks LB1 through LBk may have different line resistances and, accordingly, different delay times.

The display panel 1 may include pixel resistors RP1 through RP3 and pixel capacitors CP1 through CP3. The pixel resistors RP1 through RP3 may have resistance values of the red pixel R, the green pixel G, and the blue pixel B, and the pixel capacitors CP1 through CP3 may be capacitors respectively corresponding to capacitance values of the red pixel R, the green pixel G and the blue pixel B. Each of the pixel capacitors CP1 through CP3 may be, for example, a storage capacitor Cst or a liquid crystal capacitor Clc.

That is, the entire circuit centered on the line selector 400 can be roughly understood from the circuit diagram shown in FIG. 7.

Figure 8:
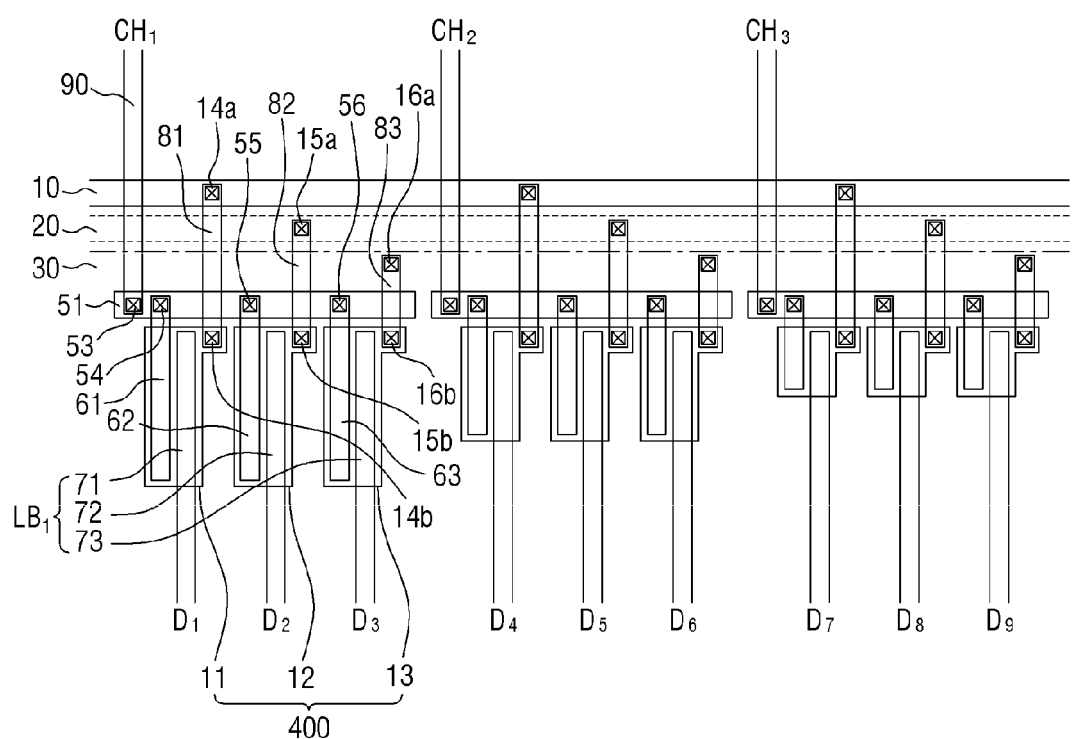
FIG. 8 is a plan view of line blocks according to an embodiment of the present invention.

FIG. 8 is a plan view of line blocks LB according to an embodiment of the present invention.

Referring to FIG. 8, the line blocks LB according to the current embodiment include an equal number of switching devices of an equal size. At least two of the line blocks LB may include switching devices of different sizes. More specifically, the line selector 400 may include a first control line 10, a second control line 20, and a third control line 30 to which the first through third selection control signals CON31 through CON33 are transmitted. In addition, the line selector 400 may include a first gate electrode 11, a second gate electrode 12, and a third gate electrode 13 which are coupled to the first control line 10, the second control line 20, and the third control line 30 by bridges 81 through 83, respectively. The first gate electrode 11, the second gate electrode 12, and the third gate electrode 13 may be electrically coupled to the first control line 10, the second control line 20, and the third control line 30 by contact holes 14a, 14b, 15a, 15b, 16a and 16b formed at the bridges 81 through 83.

Each of the line blocks LB may receive a data signal DS through a channel terminal CH, and the channel terminal CH may transmit the data signal DS to a source pad 51. The channel terminal CH may be electrically coupled to the source pad 51 by a contact hole 53 formed on the source pad 51. The source pad 51 may include a first source electrode 61, a second source electrode 62, and a third source electrode 63. The first source electrode 61, the second source electrode 62 and the third source electrode 63 may be formed on the first gate electrode 11, the second gate electrode 12, and the third gate electrode 13. The first source electrode 61, the second source electrode 62, and the third source electrode 63 may be electrically coupled to the source pad 51 by contact holes 54 through 56 formed on the source pad 51.

Each of the line blocks LB may include a first drain electrode 71, a second drain electrode 72, and a third drain electrode 73. The first drain electrode 71, the second drain electrode 72, and the third drain electrode 73 may be formed on the first gate electrode 11, the second gate electrode 12, and the third gate electrode 13. Each of the line blocks LB may transmit the received data signal DS to individual data lines through the first drain electrode 71, the second drain electrode 72, and the third drain electrode 73.

That is, the first through third drain electrodes 71 through 73 and the first through third source electrodes 61 through 63 may be formed on the first through third gate electrodes 11 through 13, and width/length ratio (W/L) of a thin-film transistor may be determined by an overlapping area between a drain electrode and a gate electrode and an overlapping area between a source electrode and the gate electrode. Generally, the thin-film transistor may be a metal-oxide-semiconductor field-effect transistor (MOSFET), and the W/L of the MOSFET may determine the magnitude of an electric current flowing through the MOSFET in response to a voltage applied to the MOSFET. That is, the magnitude of the electric current flowing through the thin-film transistor can be controlled by adjusting the W/L of the thin-film transistor, thereby controlling a slew rate.

In FIG. 8, thin-film transistors included in the first line block LB1, thin-film transistors included in the second line block LB2, and thin-film transistors included in the third line block LB3 have different sizes. Therefore, data lines coupled to each of the line blocks LB1 through LB3 may have different slew rates from slew rates of data lines coupled to the other line blocks. When the same data voltage is applied to each data line, slew rates of pixels coupled to each data line may vary according to the length of each data line from the line selector 400 to the pixels. As a result, vertical lines can be observed. Therefore, the slew rates of the pixels can be improved by designing the sizes of thin-film transistors included in each line block in view of the slew rates of pixels coupled to each measured data line.

Figure 9:
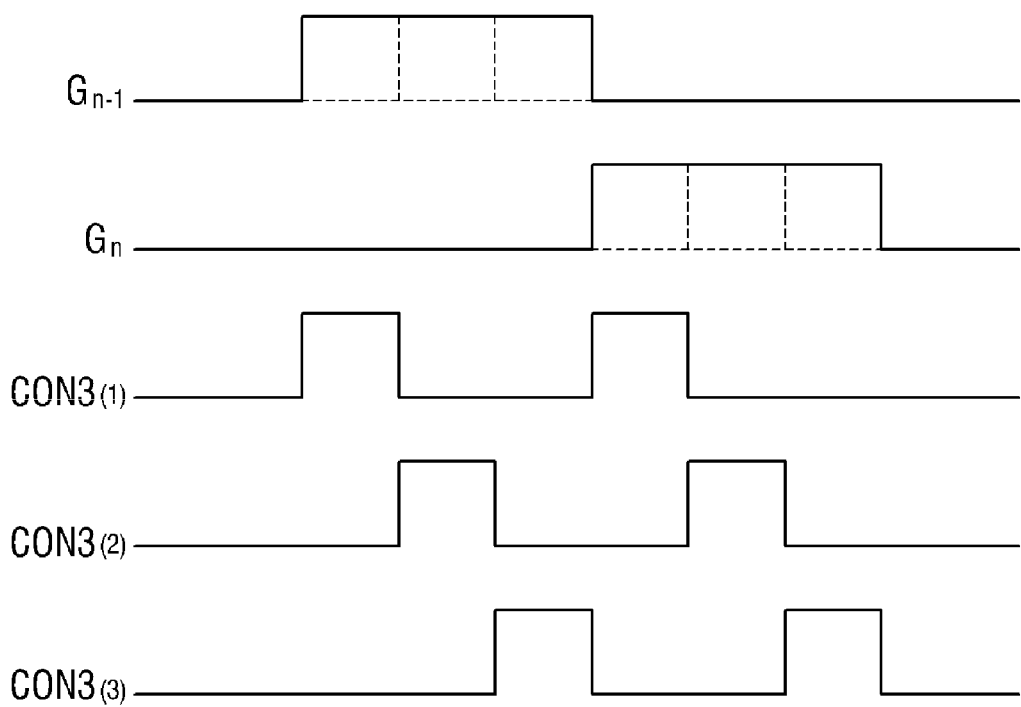
FIG. 9 is a timing diagram of selection control signals transmitted to the line selector shown in FIG. 6.

FIG. 9 is a timing diagram of the selection control signals CON31 through CON33 transmitted to the line selector 400 shown in FIG. 6. Referring to FIG. 9, the first switching device SWi1 included in the ith line block LBi may be driven by the first selection control signal CON31, the second switching device SWi2 may be driven by the second selection control signal CON32, and the third switching device SWi3 may be driven by the third selection control signal CON33. Each of the selection control signals CON31 through CON33 may be repeatedly transmitted during each period 1H of a gate signal.

Pulses of the selection control signal CON3 may be input in the order of the first selection control signal CON31, the second selection control signal CON32, and the third selection control signal CON33 as illustrated in FIG. 9. However, the present invention is not limited thereto, and the pulses of the selection control signal CON3 may also be input in the order of the third selection control signal CON33, the second selection control signal CON32, and the first selection control signal CON31. That is, in other embodiments, the order in which the pulses are input may be determined differently.

Figure 11:
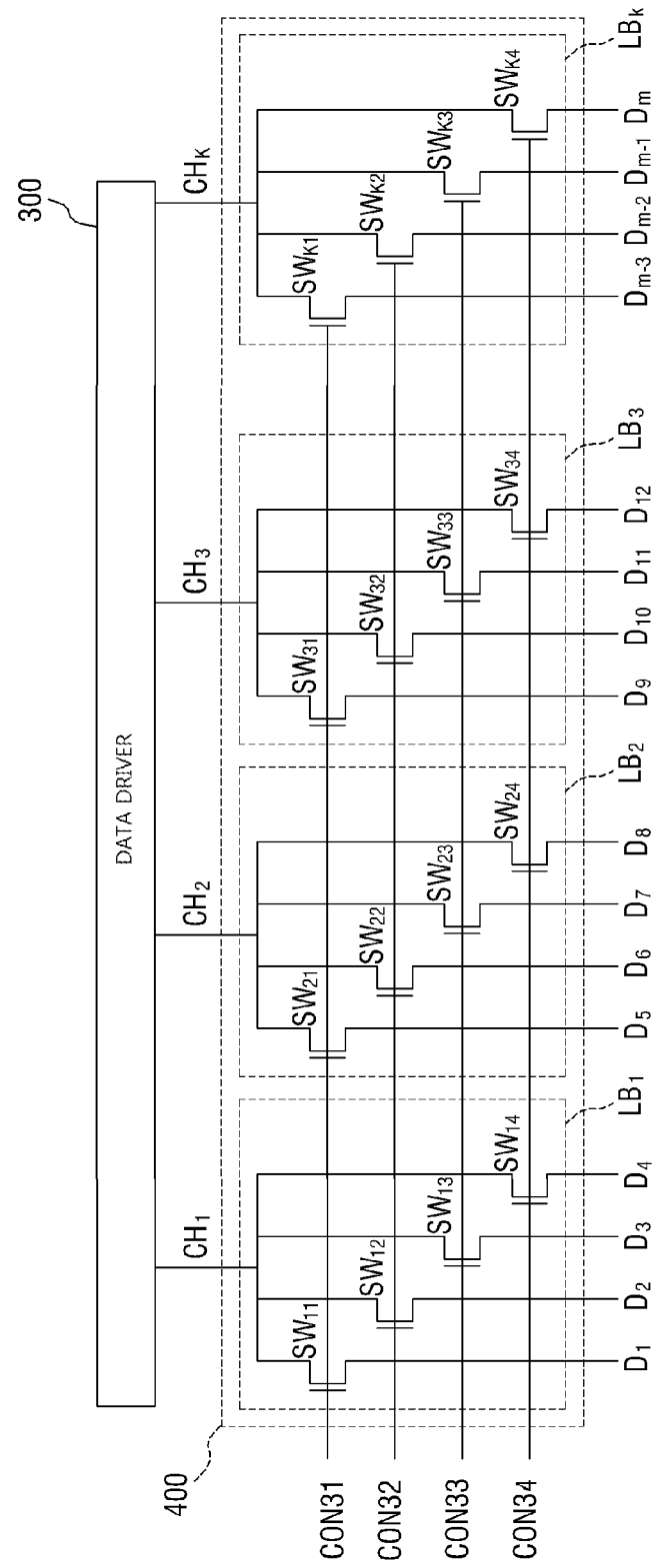
FIG. 11 is a diagram illustrating a line selector according to another embodiment of the present invention.
Figure 12:
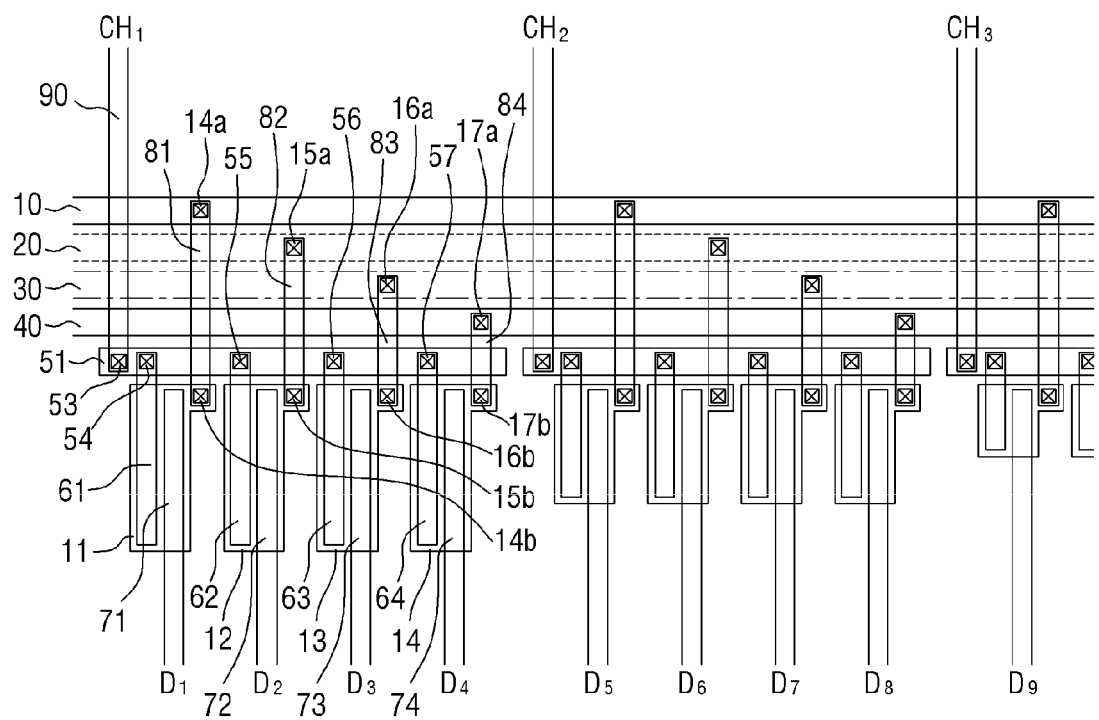
FIG. 12 is a plan view of the line selector illustrated in FIG. 11.
Figure 13:
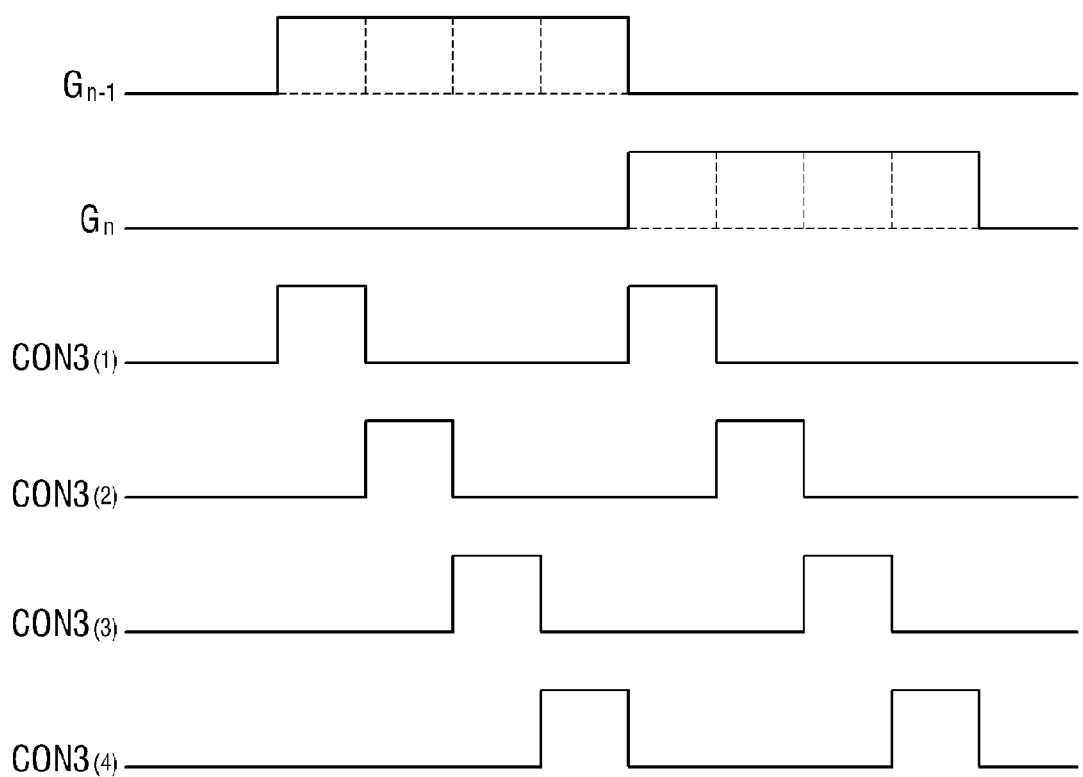
FIG. 13 is a timing diagram of selection control signals transmitted to the line selector illustrated in FIG. 11.

FIG. 10 is a diagram illustrating the structure of a display panel 100 according to another embodiment of the present invention. FIG. 11 is a diagram illustrating a line selector 400 according to another embodiment of the present invention. FIG. 12 is a plan view of the line selector 400 illustrated in FIG. 11. FIG. 13 is a timing diagram of selection control signals CON31 through CON34 transmitted to the line selector 400 illustrated in FIG. 11.

Referring to FIG. 10, the liquid crystal display panel 100 includes a plurality of gate lines G1 through Gn extending along a row direction and a plurality of data lines D1 through Dm extending along a column direction that crosses the row direction. In addition, the display panel 100 includes a plurality of pixels formed at crossing regions of the gate lines G1 through Gn and the data lines D1 through Dm. Each of the pixels is coupled to one of the gate lines G1 through Gn and one of the data lines D1 through Dm.

The pixels may include red, green, blue and white pixels R, G, B and W. In the current embodiment, the red pixel R, the green pixel G, the blue pixel B and the white pixel W may be arranged sequentially in each odd-numbered row. The red pixel R, the green pixel G, the blue pixel B and the white pixel W may also be arranged in various pentile patterns other than the arrangement pattern described in the current embodiment. For example, the red pixel R, the green pixel G, the blue pixel B, and the white pixel W may be arranged such that pixels of the same color are not arranged successively in the row direction and the column direction.

The data lines D1 through Dm are grouped into a plurality of data line blocks. Each of the data line blocks includes a plurality of data lines, for example, four data lines. Here, each channel terminal CH is coupled to a corresponding data line block including four data lines by the line selector 400.

Referring to the configuration and operation of the line selector 400 shown in FIG. 11, the line selector 400 includes a plurality of line blocks LB1 through LBk. Here, the number of the line blocks LB1 through LBk may be equal to the number of channel terminals of the data driver 300. In addition, each of the line blocks LB1 through LBk includes a plurality of switching devices, for example, four switching devices. The number of switching devices included in each of the line blocks LB1 through LBk may be equal to the number of data lines included in each data line block.

Switching devices SW11 through SW14 included in the first line block LB1 sequentially transmit a data signal output from a first channel terminal CH1 to a plurality of data lines, and switching devices SW21 through SW24 included in the second line block LB2 sequentially transmit a data signal output from a second channel terminal CH2 to a plurality of data lines. The order in which a data signal is transmitted to a plurality of data lines included in the first data line block may be the same as the order in which a data signal is transmitted to a plurality of data lines included in the second data line block. However, the present invention is not limited thereto, and data signals may also be concurrently (e.g., simultaneously) transmitted to the data lines D1 through Dm, respectively.

In the current embodiment, each line block LBi includes four switching devices SWi1 through SWi4 in order to couple one channel terminal CHi to four data lines. The switching devices SWi1 through SWi4 may be transistors. However, the present invention is not limited thereto, and the switching devices SWi1 through SWi4 may be any other devices capable of performing a switching operation.

The first switching device SWi1 included in an ith line block LBi may be driven in response to a first selection control signal CON31, the second switching device SWi2 included in the ith line block LBi may be driven in response to a second selection control signal CON32, the third switching device SWi3 included in the ith line block LBi may be driven in response to a third selection control signal CON33, and the fourth switching device SWi4 included in the ith line block LBi may be driven in response to a fourth selection control signal CON34.

FIG. 12 is a plan view of line blocks LB according to another embodiment of the present invention.

Referring to FIG. 12, the line blocks LB according to the current embodiment include equal numbers of switching devices of an equal size. At least two of the line blocks LB may include switching devices of different sizes. More specifically, the line selector 400 may include a first control line 10, a second control line 20, a third control line 30, and a fourth control line 40 to which the first through fourth selection control signals CON31 through CON34 are transmitted. In addition, the line selector 400 may include a first gate electrode 11, a second gate electrode 12, a third gate electrode 13 and a fourth gate electrode 14 which are coupled to the first control line 10, the second control line 20, the third control line 30, and the fourth control line 40 by bridges 81 through 84, respectively. The first gate electrode 11, the second gate electrode 12, the third gate electrode 13, and the fourth gate electrode 14 may be electrically coupled to the first control line 10, the second control line 20, the third control line 30, and the fourth control line 40 by contact holes 14a, 14b, 15a, 15b, 16a, 16b, 17a and 17b formed on the bridges 81 through 84.

Each of the line blocks LB may receive a data signal DS through a channel terminal CH, and the channel terminal CH may transmit the data signal DS to a source pad 51. The channel terminal CH may be electrically coupled to the source pad 51 by a contact hole 53 formed on the source pad 51. The source pad 51 may include a first source electrode 61, a second source electrode 62, a third source electrode 63, and a fourth source electrode 64. The first source electrode 61, the second source electrode 62, the third source electrode 63, and the fourth source electrode 64 may be formed on the first gate electrode 11, the second gate electrode 12, the third gate electrode 13, and the fourth gate electrode 14. The first source electrode 61, the second source electrode 62, the third source electrode 63, and the fourth source electrode 64 may be electrically coupled to the source pad 51 by contact holes 54 through 57 formed on the source pad 51.

Each of the line blocks LB may include a first drain electrode 71, a second drain electrode 72, a third drain electrode 73, and a fourth drain electrode 74. The first drain electrode 71, the second drain electrode 72, the third drain electrode 73, and the fourth drain electrode 74 may be formed on the first gate electrode 11, the second gate electrode 12, the third gate electrode 13, and the fourth gate electrode 14. Each of the line blocks LB may transmit the received data signal DS to individual data lines through the first drain electrode 71, the second drain electrode 72, the third drain electrode 73, and the fourth drain electrode 74.

That is, the first through fourth drain electrodes 71 through 74 and the first through fourth source electrodes 61 through 64 may be formed on the first through fourth gate electrodes 11 through 14, and the W/L of a thin-film transistor may be determined by an overlapping area between a drain electrode and a gate electrode and an overlapping area between a source electrode and the gate electrode. Generally, the thin-film transistor may be a MOSFET, and the W/L of the MOSFET may determine the magnitude of an electric current flowing through the MOSFET in response to a voltage applied to the MOSFET. That is, the magnitude of the electric current flowing through the thin-film transistor may be controlled by adjusting the W/L of the thin-film transistor, thereby controlling a slew rate.

In FIG. 12, thin-film transistors included in a first line block LB1, thin-film transistors included in a second line block LB2, and thin-film transistors included in a third line block LB3 have different sizes. Therefore, data lines coupled to each of the line blocks LB1 through LB3 may have different slew rates from slew rates of data lines coupled to the other line blocks. When the same data voltage is applied to each data line, slew rates of pixels coupled to each data line may vary according to the length of each data line from the line selector 400 to the pixels. As a result, vertical lines can be observed. Therefore, the slew rates of the pixels can be improved by designing the sizes of thin-film transistors included in each line block in view of the slew rates of pixels coupled to each measured data line.

Referring to FIG. 13, a first switching device SWi1 included in an ith line block LBi may be driven by the first selection control signal CON31, a second switching device SWi2 may be driven by the second selection control signal CON32, a third switching device SWi3 may be driven by the third selection control signal CON33, and a fourth switching device SWi4 may be driven by the fourth selection control signal CON34. Each of the selection control signals CON31 through CON34 may be repeatedly transmitted during each period 1H of a gate signal.

Pulses of a selection control signal CON3 may be input in the order of the first selection control signal CON31, the second selection control signal CON32, the third selection control signal CON33, and the fourth selection control signal CON34 as illustrated in FIG. 13. However, the present invention is not limited thereto, and the pulses of the selection control signal CON3 may also be input in the order of the fourth selection control signal CON34, the third selection control signal CON33, the second selection control signal CON32, and the first selection control signal CON31. That is, in other embodiments, the order in which the pulses are input may be determined differently (e.g., arbitrarily).

Figure 14:
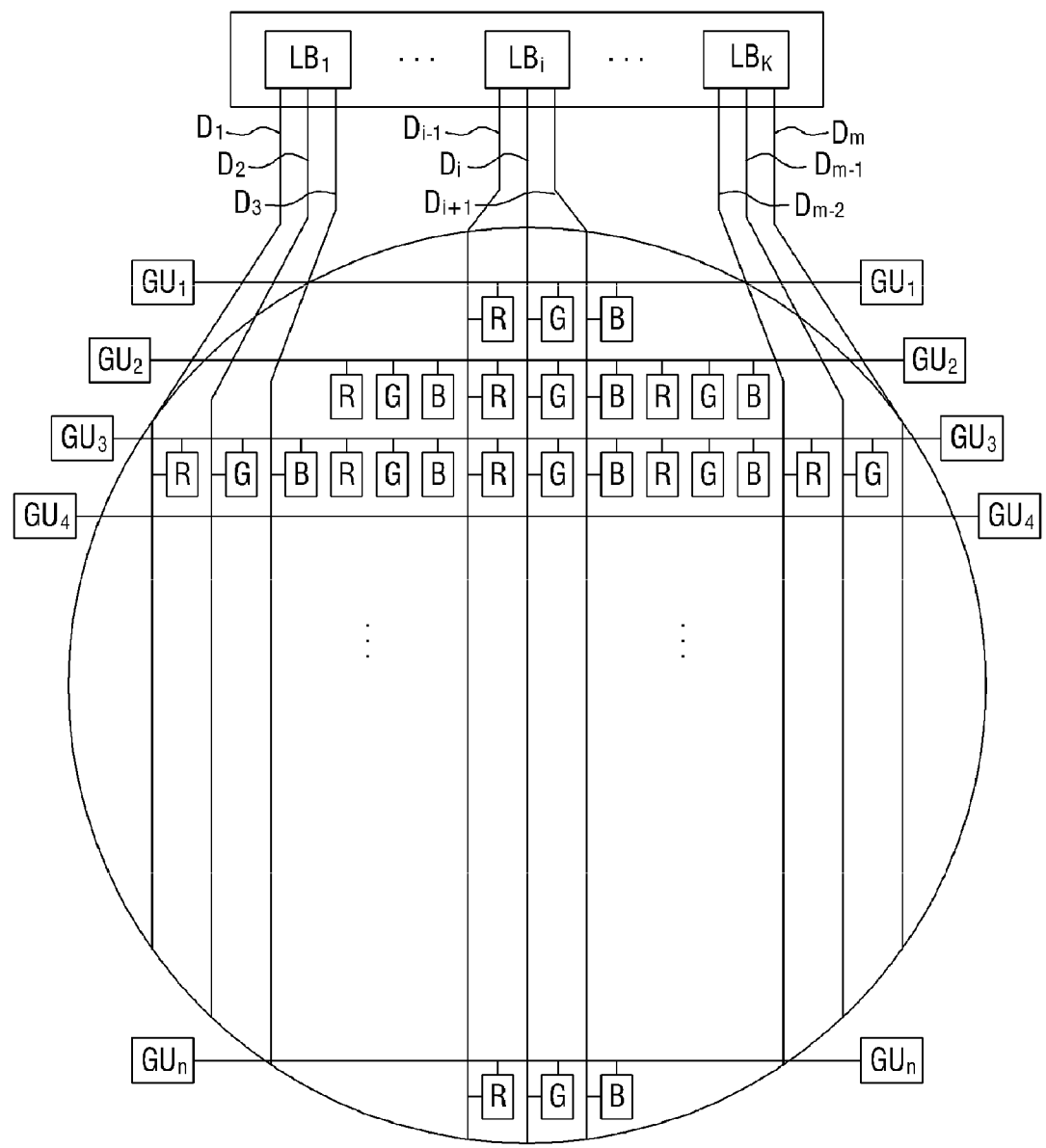
FIG. 14 is a block diagram of a display device according to another embodiment of the present invention.

FIG. 14 is a block diagram of a display device according to another embodiment of the present invention.

Referring to FIG. 14, a display panel may have a circular or polygonal shape instead of a rectangular shape. The circular display panel may also operate in the same way as the rectangular display panel 1 illustrated in FIG. 1. That is, a plurality of data lines D1 through Dm may extend from a plurality of line blocks LB along a column direction, and a plurality of gate lines G1 through Gn may extend along a row direction perpendicular to the column direction. However, the number of pixels coupled to each gate line and the number of pixels coupled to each data line may be different. Gate signal application units GU1 through GUn may transmit gate signals to the gate lines G1 through Gn.

In a rectangular liquid crystal panel, an equal number of pixels are coupled to each data line. Accordingly, there may be no significant difference between slew rates of the line blocks LB. However, in the circular display panel illustrated in FIG. 14, a different number of pixels are coupled to each data line. Accordingly, there may be a significant difference between the slew rates of the line blocks LB. That is, the sizes of thin-film transistors included in each line block LB may be designed in view of a slew rate of each measured data line.

Figure 15:
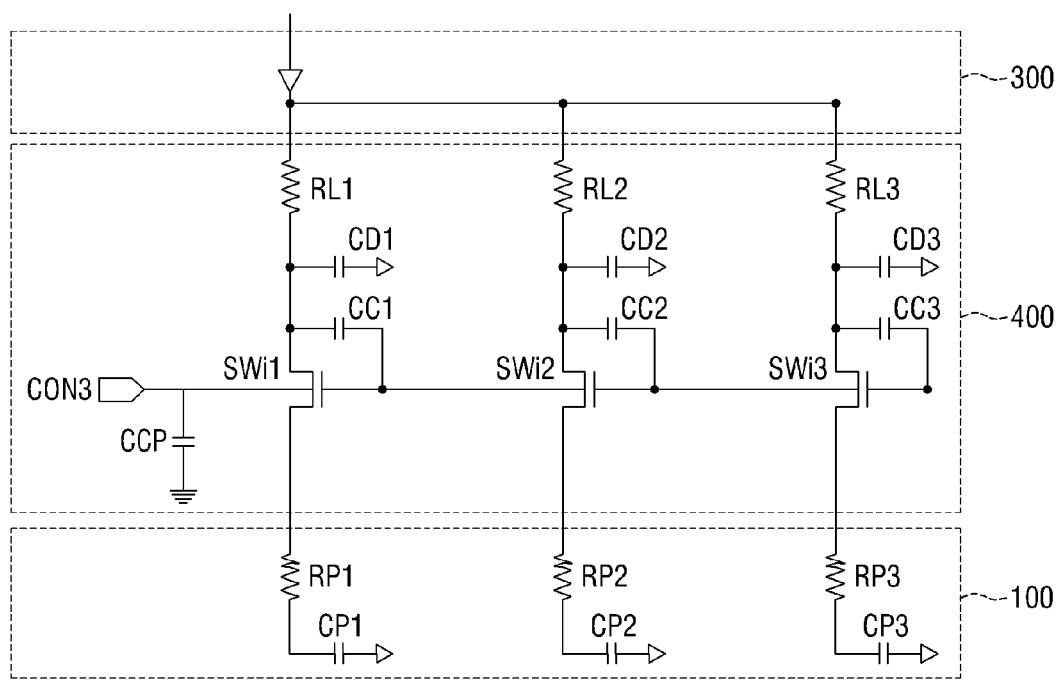
FIG. 15 is a circuit diagram of a display device according to another embodiment of the present invention.

FIG. 15 is a circuit diagram of a display device according to another embodiment of the present invention.

Referring to a circuit formed in a data driver 300, a line selector 400, and a display panel 100 shown in FIG. 15, the data driver 300 may amplify a data signal DS and transmit the amplified data signal DS to one of channel terminals CH1 through CHk. The operation of the data driver 300 may be in accordance with the driving principle of a general data driver, and thus a detailed description thereof will be omitted.

The line selector 400 may include a plurality of line blocks LB1 through LBk, and each of the line blocks LB1 through LBk may include a plurality of switching devices SW1 through SWk. The switching devices SW1 through SWk may transmit a data signal to a plurality of data lines in response to the same selection control signal CON3. For example, the switching devices SW1 through SWk of each line block LB may be controlled by a first selection control signal, a second selection control signal, or a third selection control signal. The switching devices SW1 through SWk may respectively include coupling capacitors CC1 through CCk and line capacitors CD1 through CDk. A coupling capacitor and a line capacitor may stably maintain the magnitude of a voltage applied to a switching device and maintain a voltage level at which the switching device can be turned on. Line resistors RL1 through RLk included in the line selector 4 may have resistance values that are proportional to lengths of data lines corresponding to individual pixels. The sizes of the line resistors RL1 through RLk may be determined by the lengths and thicknesses of the data lines extending from the line selector 400. That is, different line blocks LB1 through LBk may have different line resistances and, accordingly, different delay times.

A node coupled to the selection control signal CON3 may include a compensation capacitor CCP. The compensation capacitor CCP added outside the line blocks LB (inside the line selector 400) may include a greater amount of electric charge than the coupling capacitors CC1 through CCk and the line capacitors CD1 through CDk. Therefore, the magnitude of a voltage applied to each switching device can be maintained more stably. In addition, since τ (a time constant) =r*c varies according to the capacitance of the compensation capacitor CCP, a slew rate can be adjusted.

The display panel 100 may include pixel resistors RP1 through RP3 and pixel capacitors CP1 through CP3. Each of the pixel resistors RP1 through RP3 may have a resistance value of a corresponding pixel, and each of the pixel capacitors CP1 through CP3 may be a capacitor corresponding to a capacitance value of a corresponding pixel. Each of the pixel capacitors CP1 through CP3 may be, for example, a storage capacitor Cst or a liquid crystal capacitor Clc.

Figure 16:
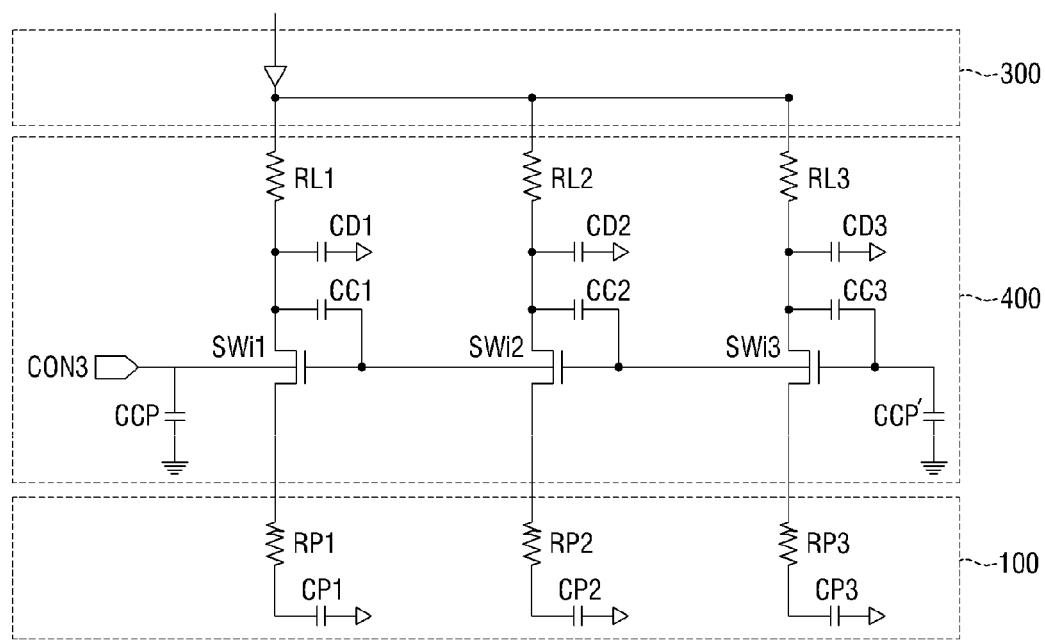
FIG. 16 is a circuit diagram of a display device according to another embodiment of the present invention.

FIG. 16 is a circuit diagram of a display device according to another embodiment of the present invention.

FIG. 16 is similar to FIG. 15. However, compensation capacitors CCP' may be added in parallel in both directions in which a selection control signal is transmitted. Capacitance of various magnitudes can be obtained by adjusting the sizes of the compensation capacitors CCP'.

Figure 17:
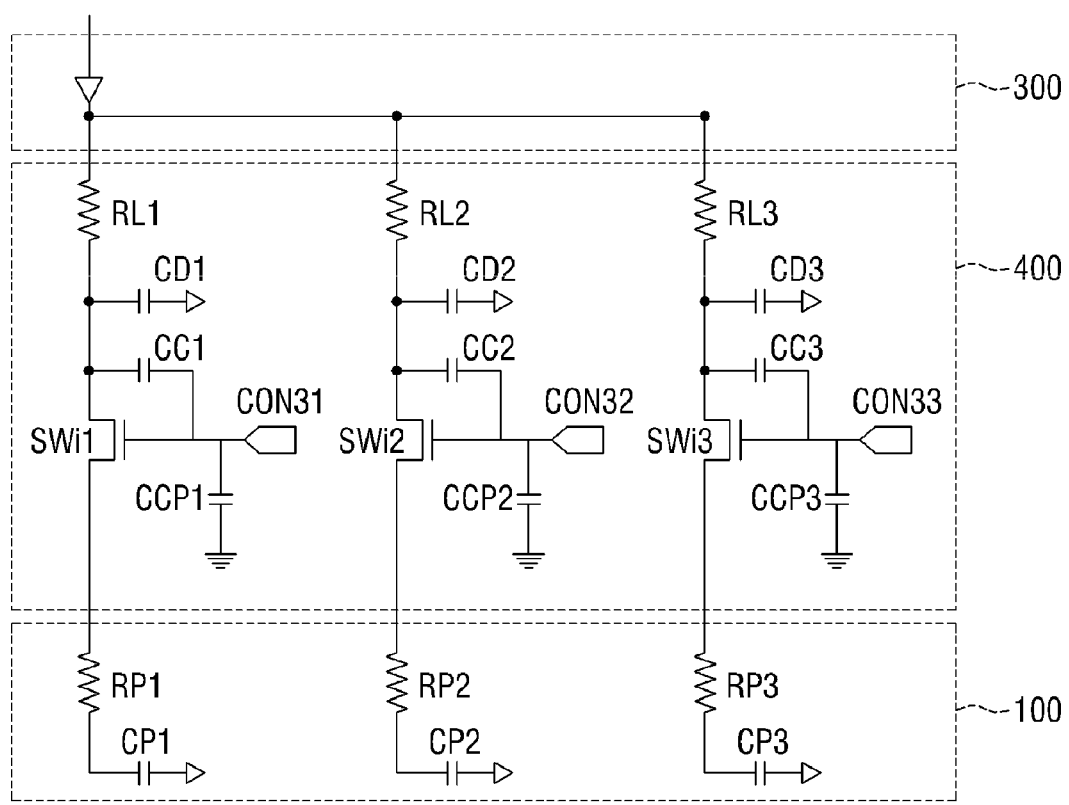
FIG. 17 is a circuit diagram of a display device according to another embodiment of the present invention.

FIG. 17 is a circuit diagram of a display device according to another embodiment of the present invention.

Referring to FIG. 17, compensation capacitors CCP1 through CCPk may be added in parallel to each line block LB. With the addition of the compensation capacitors CCP1 through CCPk to each line block LB, electric charges can be stably supplied to line blocks LB formed in the middle of a line selector 400, and a slew rate of each line block LB can be adjusted easily. However, the present invention is not limited thereto, and a compensation capacitor CCP can also be added to each plurality of line blocks LB, and the number of compensation capacitors CCP to be added may be suitably adjusted as desired by a user.

Figure 18:
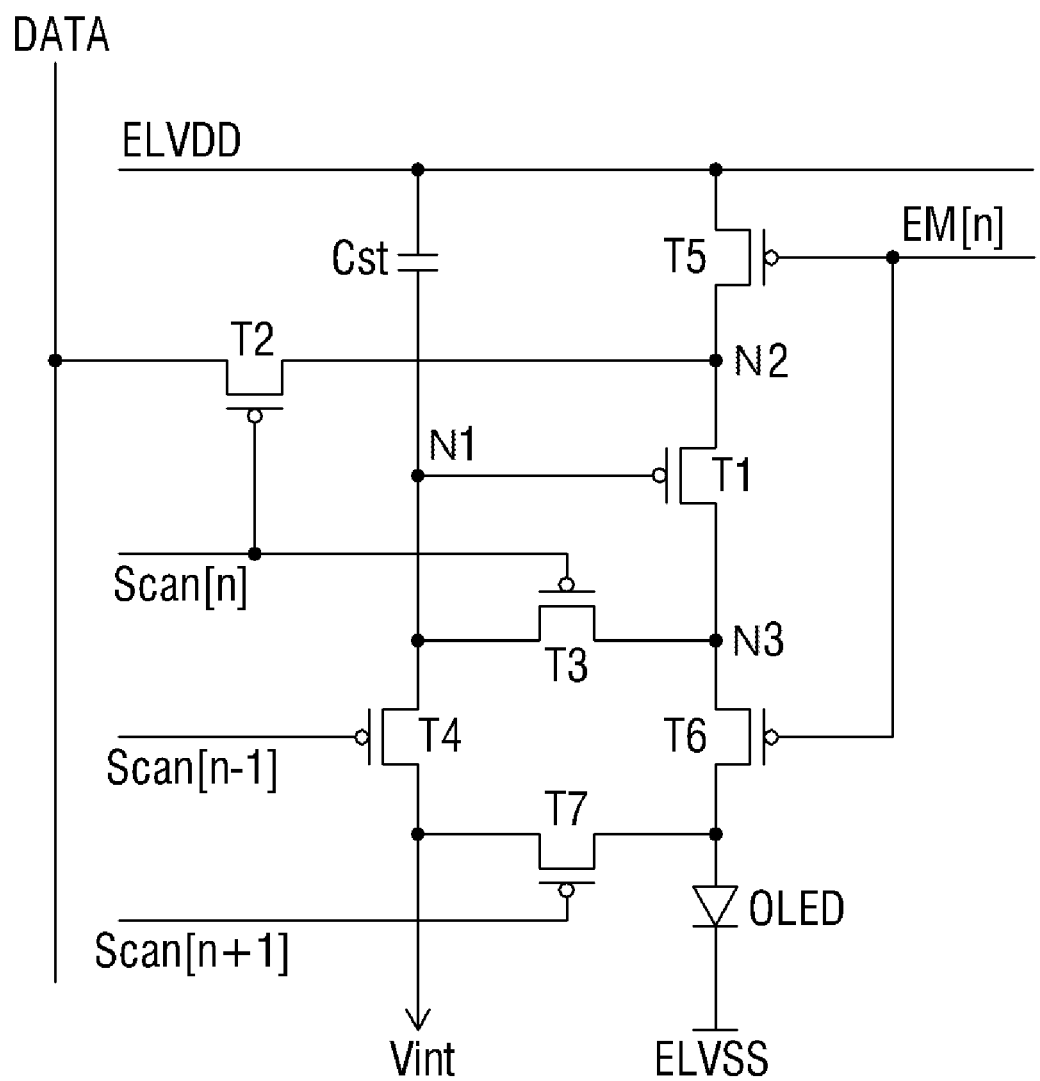
FIG. 18 is a circuit diagram of one pixel of a display device according to another embodiment of the present invention.

FIG. 18 is a circuit diagram of one pixel PX of a display device according to another embodiment of the present invention.

Referring to FIG. 18, the pixel PX includes a driving transistor T1 and an organic light-emitting diode OLED. The driving transistor T1 has a gate G coupled to a first node N1, a source S coupled to a second node N2, and a drain D coupled to a third node N3. The driving transistor T1 can control a driving current Id. The driving current Id may be an electric current flowing from the source S of the driving transistor T1 to the drain D of the driving transistor T1. The driving current Id may be an electric current flowing through the organic light-emitting diode OLED, and the organic light-emitting diode OLED may emit light at a luminance level corresponding to the driving current Id. The magnitude of the driving current Id may correspond to a potential difference between the gate G and the source S of the driving transistor T1 and a potential difference between the drain D and the source S of the driving transistor T1. For example, the greater the potential difference between the gate G and the source S, the greater the driving current Id, and the greater the potential difference between the drain D and the source S, the greater the driving current Id. Assuming that the potential difference between the gate G and the source S is maintained constant, the driving current Id may be controlled according to the potential difference between the drain D and the source S. A switching transistor T2 may apply a data voltage to the source S of the driving transistor T1. Specifically, the switching transistor T2 may apply a data voltage of a data line coupled to a source S of the switching transistor T2 to the source S of the driving transistor T1 in response to a scan signal. The magnitude of the driving current Id of each pixel may vary according to the magnitude of a voltage applied to a corresponding data line. In addition, the width of each data line for applying a voltage to pixels may be adjusted to control the resistance of the data line and control slew rates of pixels coupled to the data line and a slew rate of a line selector.

Figure 19:
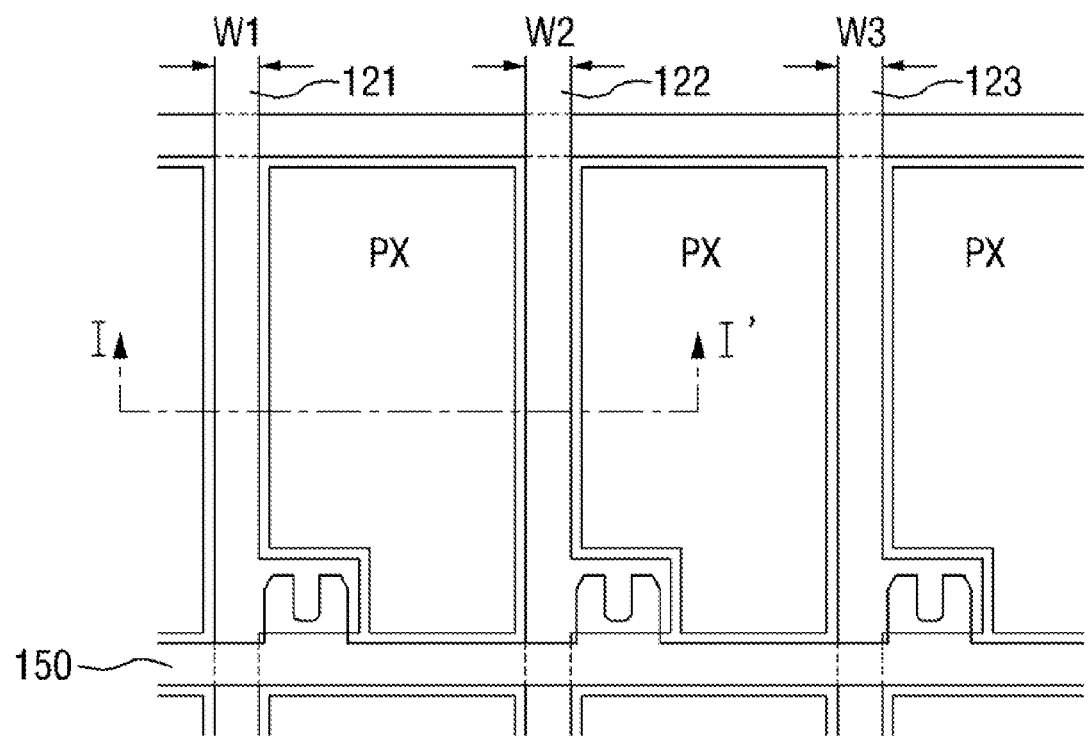
FIG. 19 is a plan view of a display device according to another embodiment of the present invention.

FIG. 19 is a plan view of a display device according to another embodiment of the present invention.

Referring to FIG. 19, a panel includes a plurality of data lines 121 through 123 extending along a column direction and a gate line 150 extending along a row direction. The data lines 121 through 123 cross the gate line 150, and a plurality of pixels PX are defined by the data lines 121 through 123 and the gate line 150. The panel has a general shape of a display device and may be a panel of an LCD, an organic light-emitting display, etc. Each of the pixels PX may include a plurality of thin-film transistors and display a signal, which corresponds to a data voltage received from a data line, in response to a signal transmitted to the gate line 150.

The data lines 121 through 123 may not have equal widths and thus may have different resistance values. Hence, resistances of the data lines 121 through 123 can be controlled by adjusting the widths of the data lines 121 through 123, and slew rates of the pixels PX coupled to the data lines 121 through 123 and a slew rate of a line selector can also be controlled by adjusting the widths of the data lines 121 through 123.

Figure 20:
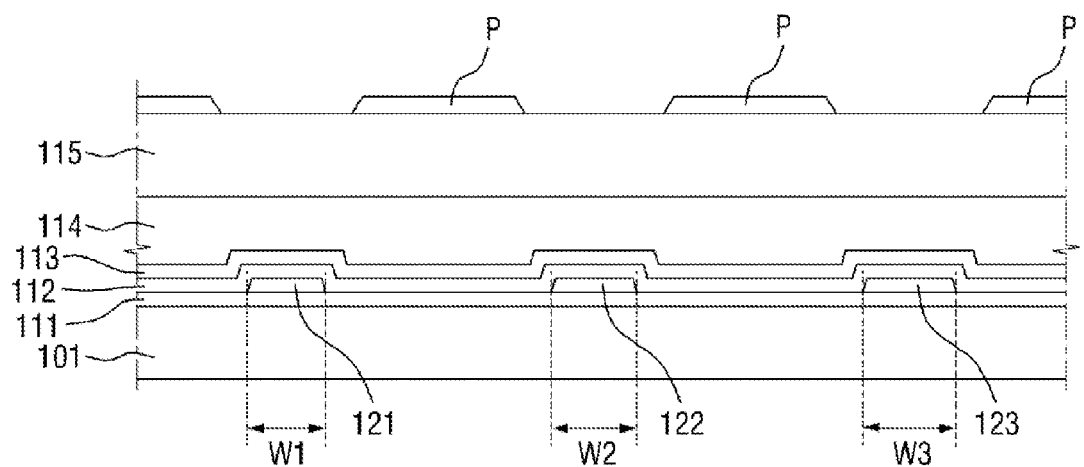
FIG. 20 is a cross-sectional view taken along the line I-I' shown in FIG. 19.

FIG. 20 is a cross-sectional view taken along the line I-I' shown in FIG. 19.

Referring to FIG. 2, a gate insulating layer 111 may be formed on a substrate 101, and gate electrodes 121 through 123 may be formed on the gate insulating layer 111. First through fourth insulating layers 112 through 115 may be formed on the gate electrodes 121 through 123 and on the gate insulating layer 111. A plurality of pixel electrodes P may be formed on the first through fourth insulating layers 112 through 115.

The gate electrodes 121 through 123 may have different widths. The first gate electrode 121 may have a first width W1, the second gate electrode 122 may have a second width W2, and the third gate electrode 123 may have a third width W3. The first width W1, the second width W2, and the third width W3 may be different from each other.

That is, a display device structured to reduce a difference in signal delay of a line selector can be provided.

In addition, a display device structured to increase (e.g., improve) the reliability of the line selector can be provided.

Furthermore, a display device structured to reduce a difference in signal delay between data lines can be provided.

However, the effects of the present invention are not restricted to the ones set forth herein. The above and other effects of the present invention will become more apparent to one of daily skill in the art to which the present invention pertains by referencing the claims, and equivalents thereof.

While the present invention has been particularly shown and described with reference to example embodiments thereof, it will be understood by those of ordinary skill in the art that various changes in form and details may be made herein without departing from the spirit and scope of the present invention as defined by the following claims, and equivalents thereof. It is therefore desired that the present embodiments be considered in all respects as illustrative and not restrictive, reference being made to the appended claims, and equivalents thereof, rather than the foregoing description, to indicate the scope of the invention.

What is claimed is:

1. A display device comprising:
   a display panel comprising a plurality of gate lines on a substrate, a plurality of data lines crossing the gate lines, and a plurality of pixels, each of the pixels being coupled to one of the gate lines and to one of the data lines;
   a data driver configured to output data signals through a plurality of channel terminals; and
   a line selector configured to transmit the data signals to a plurality of data line blocks, each of the data line blocks comprising a plurality of data lines,
   wherein the line selector comprises:
      a plurality of switching blocks each comprising a plurality of thin-film transistors;
      a plurality of selection control lines coupled to the switching blocks and configured to transmit a selection control signal;
      a coupling capacitor coupled to each of the thin-film transistors; and
      a compensation capacitor coupled to each of the selection control lines.

2. The display device of claim 1, further comprising a signal controller configured to output the selection control signal for controlling the line selector.

3. The display device of claim 1, wherein the switching blocks comprise an equal number of thin-film transistors.

4. The display device of claim 1, wherein each of the thin-film transistors is configured to transmit a data signal to a corresponding one of the data lines in response to the selection control signal.

5. The display device of claim 3, wherein the pixels comprise a red pixel, a green pixel and a blue pixel, and each of the switching blocks comprises three thin-film transistors of an equal size.

6. The display device of claim 3, wherein the pixels comprise a red pixel, a green pixel, a blue pixel and a white pixel, and each of the switching blocks comprises four thin-film transistors of an equal size.

\* \* \* \* \*